United States Patent [19]

White

[11] 4,038,510

[45] July 26, 1977

[54] FOOD TEMPERATURE CONTROL CABLE FOR MICROWAVE OVEN

[75] Inventor: James A. White, Louisville, Ky.

[73] Assignee: General Electric Company, Louisville, Ky.

[21] Appl. No.: 663,236

[22] Filed: Mar. 3, 1976

[51] Int. Cl.[2] .......................... H05B 9/06; G01K 1/08

[52] U.S. Cl. ................................ 219/10.55 E; 73/352; 219/10.55 C

[58] Field of Search ................................ 174/111, 28; 219/10.55 D, 10.55 C, 10.55 B, 10.55 E; 73/352

[56] References Cited

U.S. PATENT DOCUMENTS

| | | | |
|---|---|---|---|
| 3,105,287 | 11/1963 | Whearley et al. | 174/111 X |
| 3,652,441 | 3/1972 | Esselin et al. | 174/111 |
| 3,778,798 | 12/1973 | Heit | 73/352 X |
| 3,815,113 | 6/1974 | Welch | 73/352 X |
| 3,931,620 | 1/1976 | Wellman et al. | 73/352 X |
| 3,967,088 | 6/1976 | Horiuchi | 219/10.55 C |
| 3,974,696 | 8/1976 | Fitzmayer | 219/10.55 E X |
| 3,975,720 | 8/1976 | Chen et al. | 219/10.55 E X |
| 3,988,920 | 11/1976 | White et al. | 219/10.55 R X |
| 3,988,930 | 11/1976 | Fitzmayer et al. | 219/10.55 R X |
| 3,991,615 | 11/1976 | Hornung | 219/10.55 R X |

*Primary Examiner*—Arthur T. Grimley
*Attorney, Agent, or Firm*—Richard L. Caslin; Francis H. Boos

[57] ABSTRACT

A microwave oven is provided with a cooking cavity and an access door. The oven has a food temperature control system for monitoring the internal temperature of food being heated in the oven, and turning off the microwave power at the completion of a heating cycle, or for holding a predetermined temperature for a timed cycle. A temperature-sensing probe is adapted to be inserted into the food. The probe is equipped with a flexible electric cable that is joined to one wall of the cooking cavity for connecting the probe in a control circuit for the microwave generator. This flexible cable is provided with a plurality of diameter-increasing protrusions so, in the event the cable extends outwardly of the cooking cavity, the oven door may not be closed.

7 Claims, 4 Drawing Figures

FIG. 1
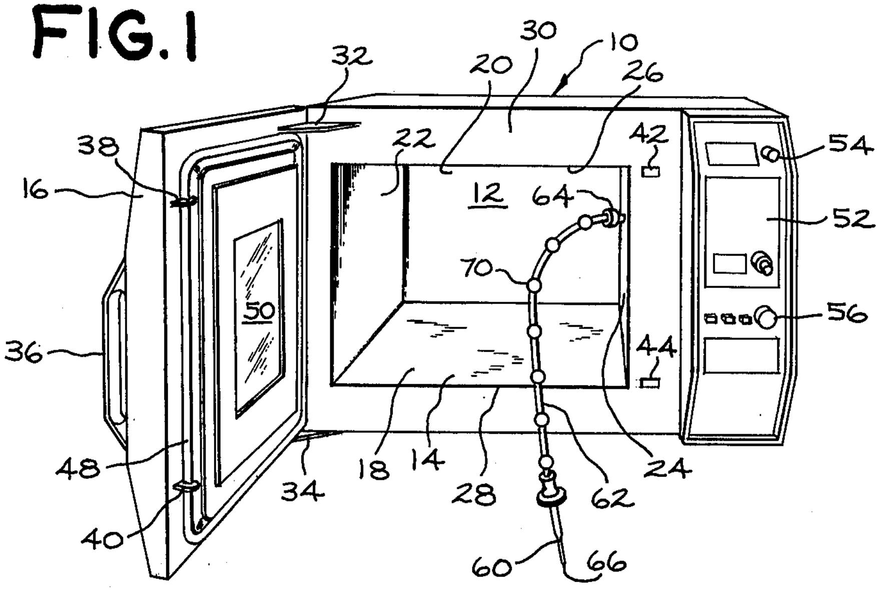
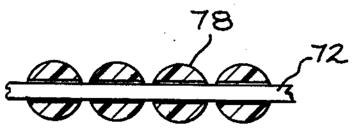
FIG. 3
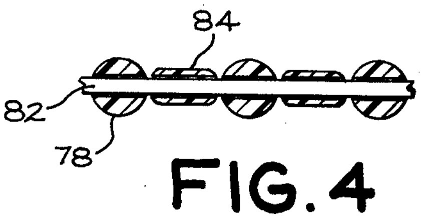
FIG. 4
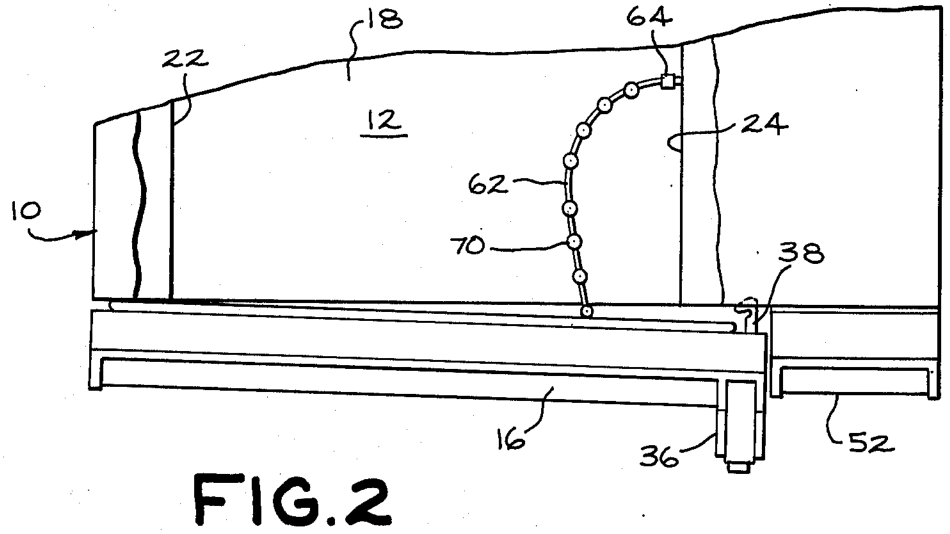
FIG. 2

FOOD TEMPERATURE CONTROL CABLE FOR MICROWAVE OVEN

BACKGROUND OF THE INVENTION

1. Field of the Invention:

This invention relates to microwave ovens for heating or cooking food, and particularly to apparatus for monitoring the internal temperture of the food while it is being cooked in the oven and for sending the sensed temperature of the food as a signal to a readout device for controlling the microwave generator.

2. Description of the Prior Art:

Heretofore, microwave ovens have been controlled by timed cycles. Special microwave oven cookbooks have been published which cover most foods that may best be cooked in a microwave oven. Hence, for a given type and size of food, the cookbook directions explain the microwave power level and the period of time, in minutes per pound, the food should be heated. Microwave ovens cook so rapidly that an overlong time setting might cause the food to be overcooked. The amount of moisture in the food is a critical factor in the time for cooking.

Conventional electric and gas ovens which provide radiant heat energy for baking and broiling food have been provided for many years with food temperature control systems which monitor the internal temperature of food being cooked, and this sensed temperature is sent as a signal to a readout device for controlling the electric or gas heaters. One example of such food temperature monitoring apparatus is shown in the patent of Stanley B. Welch, U.S. Pat. No. 3,815,113, which is assigned to the present assignee. Such food temperature controls comprise a needle-like probe that is adapted to be partially inserted into the food. The tip of the probe is fitted with a temperature-sensing thermistor. A flexible electric cable is joined to the probe and to one wall of the oven liner. Electric control circuitry is provided between the electric cable and either the electric or gas heaters to control the energization of the heaters or to set off audible signals or to indicate the food temperature on a thermometer dial.

Until recently, similar food temperature control systems have not been available in microwave ovens. In microwave ovens, the microwaves penetrate through the surface of the food and cause the molecules within the food to vibrate rapidly against each other, causing friction. This friction results in heat generated within the food, and causes the food to cook quickly. The food "loads" or absorbs microwave energy, thereby converting the energy into heat. Undesirably, the food temperature-sensing probes and cables of the conventional type would also "load" in a microwave oven. This results in undesired high electrical high electrical currents flowing along the probe and cable and consequent undesirable heating of the probe and cable. This heating of the probe and cable by direct action of the microwave energy, rather than solely by heat conducted from the food which is being cooked, causes the thermistor to sense a temperature which is higher than the actual temperature of the food. This results in a premature indication of doneness, a serious deficiency. Additionally, direct heating of the cable and the removable cable plug mounted in one wall of the oven liner results in a higher cable and plug temperature than would otherwise be the case. Such higher temperatures can shorten the life span of the cable and its plug and may make them uncomfortable to touch when removing the probe from the food and the food from the oven.

The first known food temperature control system for a microwave oven is believed to be taught in the co-pending patent application Ser. No. 616,049, filed Sept. 23, 1975, by David Y. Chen and Louis H. Fitzmayer, entitled Food Thermometer For Microwave Oven. Although this food thermometer for a microwave oven has been found to be highly successful in its adaptation to a microwave oven, the present invention contributes additional features, not alluded to in the referenced pending U.S. application, which further enhance the utility of a food temperature control system for a microwave oven.

It is important that the microwave energy for heating the food within the oven not be allowed to radiate outside of the oven cooking cavity. Hence, microwave oven doors are generally provided with a door latch and a minimum of two operative interlocks, including at least one concealed safety interlock which must not be operable by any part of the body or by the use of a rod 3 millimeters or greater in diameter and with a useful length of ten centimeters. Accordingly, the microwave generator cannot be energized until the oven door is first fully closed and latched, and the generator is first de-energized before the oven door is unlatched and allowed to be opened. See, for example, U.S. Pat. No. 3,816,688, entitled Safety Interlock System for Microwave Ovens.

The principal object of the present invention is to provide a food temperature control system for a microwave oven with a flexible cable having a plurality of diameter-increasing protrusions to insure the door may not be fully closed in the event the cable were protruding out of the oven.

A further object of the present invention is to provide a flexible cable of the class described where the protrusions are loosely fitted upon the cable.

SUMMARY OF THE INVENTION

The present invention relates to a food temperature control system for a microwave oven comprising a temperature-sensing probe and a flexible electric cable connected to one wall of the oven liner for joining the probe in the oven control circuit. The cable is provided with a plurality of diameter-increasing protrusions to insure that the probe and cable may not extend out of the oven cavity and, at the same time, the oven door closed and latched to close the safety interlock switches and energize the microwave generator.

BRIEF DESCRIPTION OF THE DRAWINGS

This invention will be better understood from the following description taken in conjunction with the accompanying drawings, and its scope will be pointed out in the appended claims.

FIG. 1 is a front elevational view of a microwave oven shown with the oven door in its open position, and with the temperature-sensing probe and cable extending out of the oven cooking cavity to interfere with the proper closing of the door.

FIG. 2 is a top plan view with parts broken away to show the oven liner partly in cross-section, while the oven door shown in full view with the cable caught in the door gap, and the door unable to be closed.

FIG. 3 is a fragmentary view on an enlarged scale partly in cross-section of a short length of a modified cable showing closely-spaced loose beads fitted on the cable.

FIG. 4 is another modification of the cable, shown in a fragmentary view similar to FIG. 3, where a plurality of loose beads are separated by loose spacers.

DESCRIPTION OF THE PREFERRED EMBODIMENTS

Turning now to a consideration of the drawings and in particular to FIG. 1, there is shown a microwave oven 10 having an oven cooking cavity 12 formed by a box-like oven liner 14 and a front-opening access door 16. The oven liner 14 has a bottom wall 18, back wall 20, left and right side walls 22 and 24, a top wall 26, and a front door opening 28. Surrounding the door opening 28 is a front door frame 30. The oven door 16 is a side-swinging door having top and bottom hinge straps 32 and 34. The door 16 includes an outer door handle 36 which includes a latch release button (not shown) that cooperates with a pair of latch hook members 38 and 40 on the inner side of the door which cooperate with keeper slots 42 and 44, respectively, in the front frame 30. Interlock switches (not shown) are positioned behind the keeper slots 42 and 44 to cooperate with the latch hook members to insure that the microwave generator can only function when the oven door is fully closed and latched.

A choke seal 48 is built into the inner face of the door to cooperate with the front frame 30 of the oven body and prevent microwave radiation leakage out the door gap when the door is closed and latched. The door 16 includes a viewing window 50 which includes a metal screen (not shown) which reflects the microwaves back in the oven cavity 12.

As is conventional, the oven 10 is provided with a magnetron tube (not shown) for generating microwaves at a predetermined frequency, preferably at a nominal frequency of 2450 $MH_z$. Beside the oven is a front control panel 52 which includes various control componenets 54 and 56 such as a variable power level control, oven timer, food temperature control, oven start button, and a recipe dial.

Apparatus according to the present invention includes a temperature-sensing probe 60 and a flexible, shielded electric cable 62 connected at one end to the probe 60 and at its other end to a plug 64 which fits into a jack (not shown) that would be mounted in the side wall 24 of the oven liner 14.

The probe 60 is of metal tublar form having a distal end 66 that is closed and pointed to facilitate insertion into food such as a ham, roast, turkey, etc. The tip of the probe includes a thermally-responsive electrical element such as a thermistor (not shown) which is adapted to be connected by means of the cable 62 to a readout device and the oven control circuit (not shown) for governing the microwave generator. One important advantage of a food temperature control system used in a microwave oven is that when the internal temperature of the food reaches a preselected temperature, the oven power may be de-energized and the cooking action will stop immediately. This is to be compared to a conventional electric oven using metal sheathed electrical resistance heating elements which provide radiant heat as long as they are hot.

The flexible cable 62 must be of a convenient length so the food may be handled or turned within the oven without being restricted by a short cable. The cable is usually about ⅛ inches in diameter and is somewhat compressible. If the probe and its cable were to extend out of the oven as shown in FIG. 1 and the door 16 were slammed shut, it might be possible to flatten the cable enough to enable the latching of the door closed, which would enable the operation of the microwave generator. This is not acceptable because the cable caught in the door cap could allow an excessive leakage of microwave energy.

The cable 62 of the present invention is of special design with a plurality of diameter-increasing protrusions 70 which are spaced along the length of the cable, or provided at least at the end of the cable, which is capable of extending out of the door opening 28 and to interfere with the proper closing of the door. These protrusions 70 should be formed of a material that is transparent to microwave energy, such as glass-ceramic, polypropylene, polytetrafluorethylene, silicone, or wood. The protrusions may either be molded or glued in place along the cable with relatively wide spacing.

FIG. 3 shows a modified cable design 72 where the protrusions are in the form of a plurality of loose beads 78 strung along the length of the cable in the manner of a necklace.

A third modification is shown in FIG. 4 where the cable 82 is fitted with loose beads 78 and loose spacers 84. In any event, it is important to maintain a highly flexible cable for ease of handling while, at the same time, increasing the diameter of the cable to such an amount that it is not possible to capture the cable in the door gap and latch the door shut at the same time. As shown in FIG. 2, the cable 62 of the present invention prevents the latching of the door 16; hence, the user is forced to return the probe and cable to the oven before the oven can be operated.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. Apparatus for monitoring the internal temperature of food being heated in the cooking cavity of a microwave oven, said cooking cavity being formed by a box-like oven liner and an access door, said apparatus comprising:

a. a temperature-sensing probe adapted for insertion into the food to be heated;

b. an elongated flexible electric cable joined to the probe and adapted to connect the probe to one wall of the oven liner for joining the cable in a temperature control circuit;

c. said cable supporting a plurality of diameter-increasing protrusions.

2. The apparatus of claim 1, wherein the said plurality of protrusions are transparent to microwave energy.

3. The apparatus of claim 2 wherein the said plurality of protrusions comprise a series of spaced beads fixed along the length of the cable.

4. The apparatus of claim 2 wherein the said plurality of protrusions comprise a series of loose beads strung along the length of the cable in close relationship.

5. The apparatus of claim 2 wherein the said plurality of protrusions comprise a series of beads that are separated by spacers.

6. The apparatus of claim 2 wherein the protrusions are selected from a classs of materials such as glass-ceramic, polypropylene, polytetrafluorethylene, silicone, and wood.

7. The apparatus of claim 2 wherein the said protrusions are located on the end of the cable nearest the temperature-sensing probe, so, in the event the cable extends out of the cooking cavity, the door may not be fully closed.

* * * * *